United States Patent
Lehtovaara et al.

(10) Patent No.: US 6,422,962 B1
(45) Date of Patent: Jul. 23, 2002

(54) TIMING BELT TENSIONER WITH A BACKSTOP DEVICE WITH CONTROLLED ONE-WAY MECHANISM

(75) Inventors: Jorma J. Lehtovaara, Etobicoke; K. Mats Lipowski, Toronto; Marek Frankowski; Jacek Stepniak, both of Stroud, all of (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 09/547,111

(22) Filed: Apr. 11, 2000

(51) Int. Cl.⁷ .................................................. F16H 7/22
(52) U.S. Cl. ...................................... 474/101; 474/135
(58) Field of Search ................................ 474/101, 113, 474/114, 115, 116, 117, 135, 136

(56) References Cited

U.S. PATENT DOCUMENTS

| | | | |
|---|---|---|---|
| 2,051,488 A | * | 8/1936 | Kottlowski et al. ......... 474/110 |
| 2,703,019 A | * | 3/1955 | Burawoy .................... 474/110 |
| 3,631,681 A | * | 1/1972 | Taylor ....................... 61/45 D |
| 3,631,734 A | * | 1/1972 | Wagner ............... 74/242.11 R |
| 4,299,584 A | | 11/1981 | Sproul |
| 4,355,991 A | | 10/1982 | Kraft |
| 4,657,524 A | | 4/1987 | Okabe |
| 4,674,996 A | | 6/1987 | Anno et al. |
| 4,743,225 A | | 5/1988 | Okabe |
| 4,808,148 A | | 2/1989 | Holtz |
| 4,854,922 A | * | 8/1989 | Hertrich et al. ............. 474/110 |
| 4,917,655 A | | 4/1990 | Martin |
| 5,152,721 A | | 10/1992 | Sajczvk et al. |
| 5,480,358 A | | 1/1996 | Sakai et al. |
| 5,591,094 A | | 1/1997 | Farmer et al. |

FOREIGN PATENT DOCUMENTS

| | | |
|---|---|---|
| DE | 3718227 A1 | 12/1988 |
| DE | 3741860 A1 | 6/1989 |

OTHER PUBLICATIONS

International Search Report for corresponding PCT International No. PCT/CA00/00383, filed Apr. 12, 2000, Search Report dated Jul. 20, 2000 (9 pages).
Patent Abstracts of Japan, Publication No. 05071603, published Mar. 23, 1993 for No. 03265167, application date Sep. 17, 1991.

* cited by examiner

Primary Examiner—Thomas R. Hannon
Assistant Examiner—Vicky A. Johnson
(74) Attorney, Agent, or Firm—Pillsbury Winthrop LLP

(57) ABSTRACT

A tensioner for an endless belt comprising a stationary structure on which a pivotal tension arm with an idler pulley is mounted. A spring between the tension arm and the stationary structure acts to bias the pulley against the belt, thereby applying tension. The invention includes a one-way device that is operable in response to the extent of pivotal movement of the tension arm in the forward direction to establish different positions at which pivotal movement in the return direction is limited. A damping system is used to restrict pivotal movement of the tension arm as a result of sudden short-time vibratory movements or dynamic vibrations in cold conditions.

11 Claims, 3 Drawing Sheets

US 6,422,962 B1

TIMING BELT TENSIONER WITH A BACKSTOP DEVICE WITH CONTROLLED ONE-WAY MECHANISM

FIELD OF INVENTION

This invention relates to a timing belt tensioner having a one-way mechanism which allows a controlled movement of the tensioner arm or arm stops towards the tensioner free arm position.

BACKGROUND OF THE INVENTION

There are several tensioner designs where the tensioner arm movements toward the free arm position are controlled with an one-way mechanism. U.S. Pat. No. 4,145,934 describes a wedge which is pushed against the arm eccentric (lever) so that the arm cannot rotate outwards once the tensioner arm is biased towards the belt by a tensioning spring. U.S. Pat. No. 4,351,636 describes a tensioner similar in principle except that the one-way wedge is replaced by a ratchet/pawl assembly. Another ratchet and pawl mechanism is described in U.S. Pat. No. 4,634,407.

Each of the above-mentioned tensioners described a one-way mechanism, which does not allow the tensioner arm to rotate away from the belt once the arm is allowed to move inwards toward the belt.

U.S. Pat. No. 4,583,962 offers an improvement to these designs by describing a mechanism which allows a limited return stroke of the arm towards the backstop required by the thermal expansion of the engine. The detail design of this patent describes a spring clutch type one-way device and an arc shape slot wherein the arm is free to rotate backwards.

U.S. Pat. No. 4,808,148 describes a design wherein the slot controlled reverse stroke is replaced by a resilient biasing element such as elastomeric spring located between the ratchet and pawl assembly and the stationary mounting member.

U.S. Pat. Nos. 4,822,322 and 4,834,694 describe tensioners wherein the one-way mechanisms are conventional one-way (roller) clutches and the arm return strokes are controlled by arc shaped slots.

U.S. Pat. No. 4,923,435 describes a tensioner wherein the arm can have a return stroke controlled by a viscous clutch between the arm and the one-way mechanism.

All of the above-mentioned known one-way devices, even those with a controlled return stroke of the arm, have a fundamental problem in allowing the one-way mechanism to move toward the belt (free arm position) whenever engine conditions are such that this can happen. In very cold engine conditions, especially those below freezing temperatures, the engine behavior can be quite erratic. Consequently, the tensioner arm can move towards the free arm position considerably more than in normally running engine conditions, either due to the engine vibrations, stiff valve train/camshaft bearings or stiff or frozen tensioner pulley bearings. This excessive arm movement results in the stops in the one-way mechanism being rotated together with the arm too far toward the free arm direction which eventually causes the tensioner arm to hit the backstop once the normal hot running conditions of the engine are reached. Since it is not normally possible to increase the amount of return stroke allowed for the arm before hitting the backstop without simultaneously increasing the possibility for the tooth skip, all of the known one-way mechanisms used to control the tensioner arm movement can create the above-mentioned failure conditions in the engines operating in cold climate conditions.

SUMMARY OF THE INVENTION

Accordingly, there exists a need for a tensioner which will solve the problems identified above.

An object of the present invention is to solve the problems enunciated above. In accordance with the principles of the present invention, this objective is obtained by providing a tensioner for an endless belt which comprises a stationary structure. A pivotal structure is mounted on the stationary part for pivotal movements in forward and return directions about a pivotal axis. A pulley is rotatably carried by the pivotal structure for rotational movement about a rotational axis parallel to the pivotal axis. A spring is provided which acts between the structures to bias the pivotal structure to pivot in the forward direction corresponding to a movement of the pulley into belt tensioning relation to a belt with which the pulley is rollingly engaged. A one-way device has structure constructed and arranged to be operable in response to the extent of pivotal movement of the pivotal structure in the forward direction to establish different positions at which pivotal movement of the pivotal structure in return direction is limited. A damping mechanism is provided having structure constructed and arranged to restrict pivotal movement of the pivotal structure in one direction as a result of sudden short-time vibratory movements or dynamic vibrations in cold conditions.

BRIEF DESCRIPTION OF THE DRAWINGS

These and other objects, features and advantages of the present invention will be more fully appreciated from the following detailed description when considered in connection with the accompanying drawings, in which the same or like reference numerals designate the same or corresponding parts throughout and in which.

DESCRIPTION OF THE INVENTION

Figure 1:
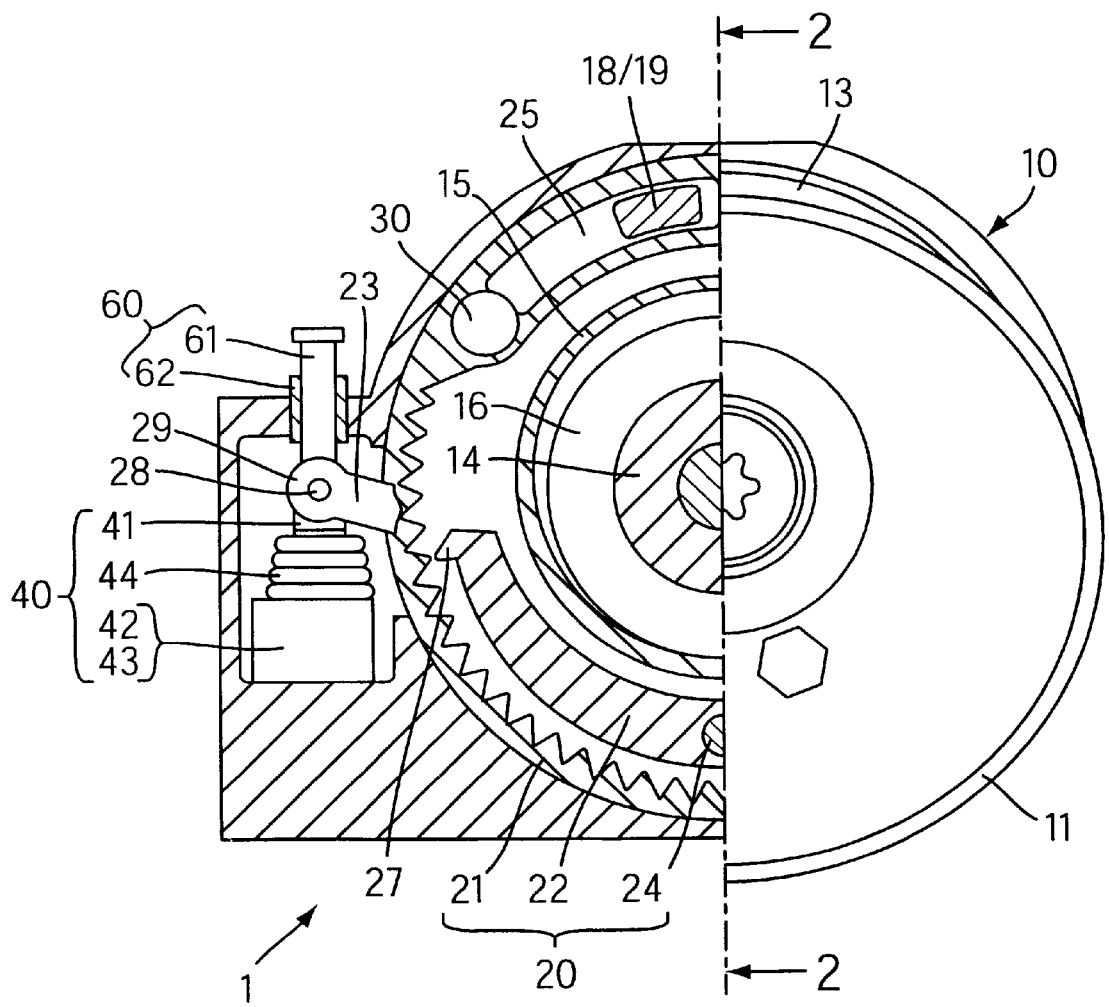
FIG. 1 is a top plan view, partially broken away, of the tensioner apparatus of the present invention illustrating the tensioner assembly and the pulley assembly.
Figure 2:
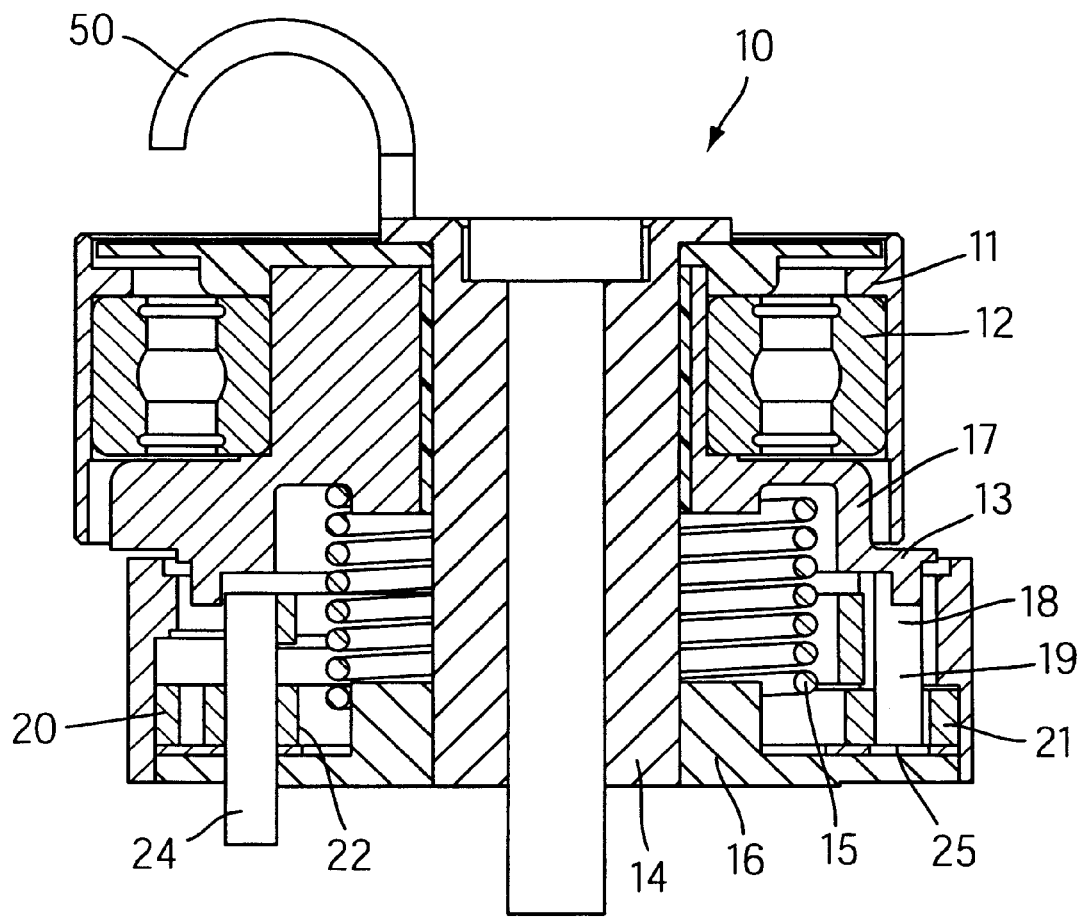
FIG. 2 is a cross-sectional view taken along section lines 2—2 of the tensioner apparatus shown in FIG. 1.

The tensioner apparatus 1, illustrated in FIGS. 1 and 2, comprises a conventional tensioner 10, a one-way device 20 and damping unit 40. The conventional tensioner unit 10 comprises a pulley 11, mounted on a ball bearing assembly 12 mounted about a pivotal structure (tensioner arm) 13 which has an offset bore for pivotally mounting on pivot shaft 14. Arm 13 is biased towards a belt (not shown) by a spring 15 extending between the arm 13 and base plate 16.

The one-way device 20 comprises a ratchet-wheel 21 and a pawl 22. Pawl 22 is a generally arcuate member having an extended tip 23 at one end and pivotally mounted at a pivot post 24 intermediate opposite ends of the arcuate section. The pivot post 24 is fixed to a stationary part or structure of the tensioner, such as a base plate 16 or an extended part of the pivot shaft 14. At opposite ends of the arcuate section are catch teeth 26 and 27. Tip 23 extends outwardly from the arcuate section of pawl 22 to engage the damping unit 40.

Ratchet wheel 21 comprises a ring having a plurality of teeth on the inside surface. The teeth extend about most of the inside surface. The ring has a wider section which has an arcuate slot 25. At opposite ends of slot 25 are bumpers 30 and 31. Base plate 16 has a circular counter bore which receives the ratchet wheel 21. Pawl 22 is mounted within the ratchet wheel 21 such that as the pawl 22 pivots one or the other of the catch teeth 26 and 27 engages the inner teeth of the ratchet wheel 21.

The damping unit 40 comprises a piston 41, a cylinder 42 filled with fluid 43 and a seal 44. Piston 41 is hingedly attached to the tip 23 of pawl 22 at pin lever 28 at the distal end 29 of tip 23.

The mechanism 60 comprises a push button pin 61 arranged to slide in and out inside guide bushing 62. Push button 61 engages tip 23 to enable a return stroke for the one-way device 20.

The conventional arm 13 has a downwardly facing cup shaped body 17 with a downwardly extending stop post 18. The bottom end 19 of the stop post 18 extends into slot of the ratchet-wheel 21 as shown in FIG. 2.

Figure 3:
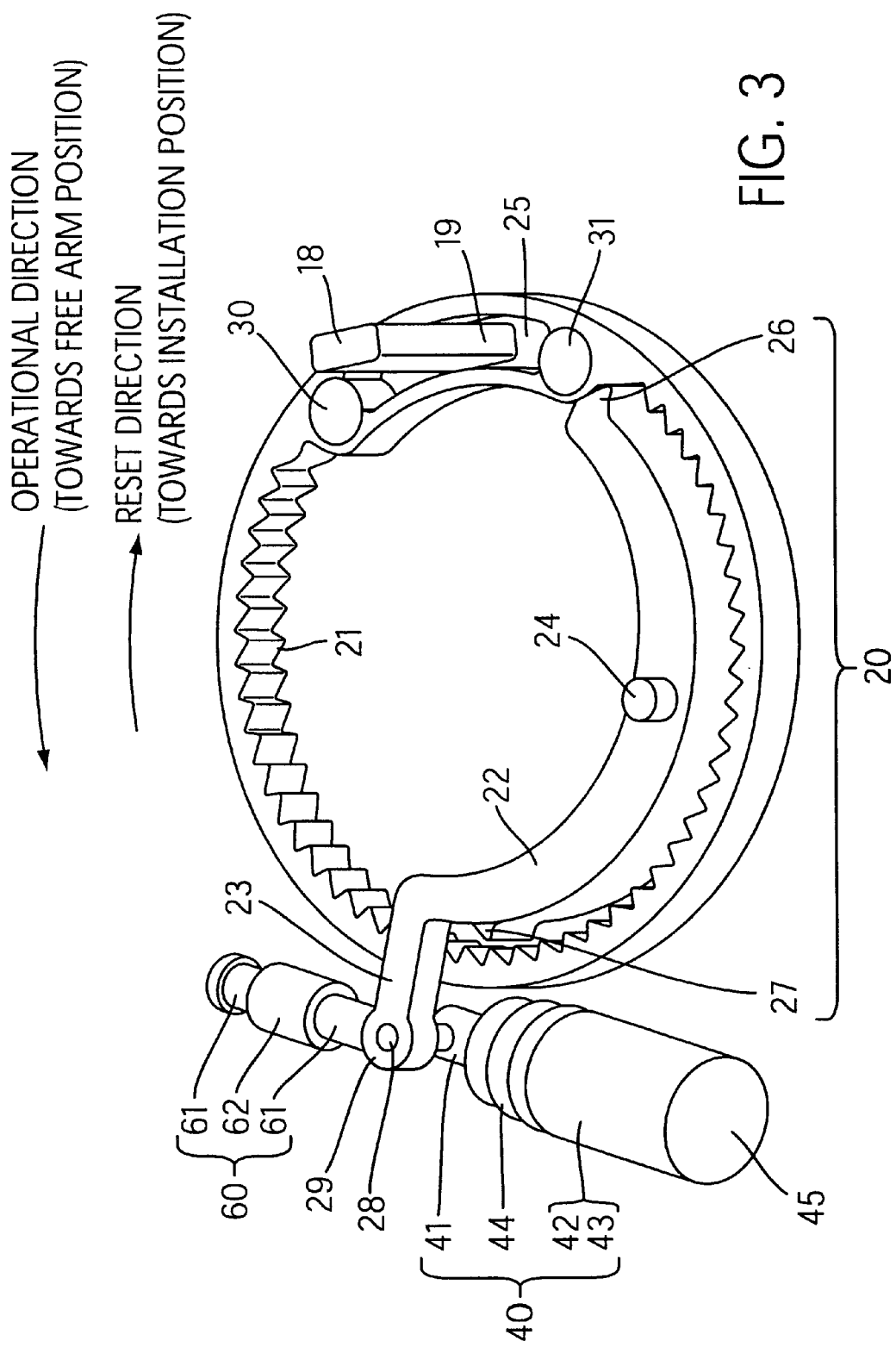
FIG. 3 is a perspective view of the one-way device, the damping unit and the stop interface between the one-way device and the arm.

The functionality of the present invention is now described referring to the above-mentioned figures. Prior to the installation of the tensioner to the engine, the arm 13 and the ratchet wheel 21 are rotated to installation position, namely, to the position where the pulley 11 is spaced as far away from the belt as possible and the tensioner spring 15 is wound up to its maximum torque. In FIG. 3 this installation position is in a clockwise direction as is allowed by the design of the arm 13, the ratchet-wheel 21 and the pawl 22. If required, the arm 13 can be locked into an installation position by an installation pin 50 that extends through the arm 13 into the base plate 16. After the tensioner 10 and the belt has been installed on the engine, the installation pin 50 is removed. At this moment, the tensioner spring 15 will rotate the arm 13 into an operational position, in FIG. 3 counter-clockwise. The extended post 18 of the arm 13 will rotate within the stop slot 25 of the ratchet-wheel 21 until it hits the "free arm" end of the slot. In order to reduce noise and impact forces, free arm bumper 30 and hot stop bumper 31 are preferably made out of some relatively soft elastomer material.

As soon as the arm post 18 contacts the bumper 30, it responsively rotates the ratchet-wheel 21 in counter-clockwise direction. The rotation of the wheel 21 will urge the catch tooth 26 out of the contact with the wheel 21 by rotating the ratchet-pawl 22 about the pivot pin 24 in counter-clockwise direction. The rotation of the pawl 22 will move the extended tip 23 towards the cylinder 42. The piston 41 will move towards the bottom end 45 of the cylinder 42 simultaneously compressing the seal 44 which also acts as a compression spring. Both the compression of the seal 44 and the displacement of the cylinder fluid 43 from one side of the piston to the other create a counter force restricting the lever action of the pawl 22.

The tensioner spring 15 through the arm 13 creates a torque which rotates the wheel 21. When the spring force is large enough to overcome the above-mentioned counter forces, the wheel 21 will rotate until it pushes the catch tooth 26 all the way out of the contact with the wheel. At this point, the wheel 21 continues to rotate until another tooth of the wheel engages the second catch tooth 27 of the pawl 22 which has been rotated into a tooth stop of the wheel by the lever action on the pawl 22. As a result of the self-locking geometry between the second catch tooth 27 and the lever pin 24, the rotation of counter-clockwise rotation of the wheel 21 is not possible to push the second catch tooth 27 out of the contact and the rotation of the wheel is stopped after the rotational movement which corresponds to the angular width of one tooth sector. However, provided the axial spring force created by the seal 44 is large enough to overcome the hydraulic flow and/or viscous damping forces created by the cylinder fluid 43, the piston 41 is pushed outwards from the cylinder 42 pushing the extended tip 23 of the pawl 22 to move the catch tooth 27 out of the contact with the wheel 21. At this point, the first catch tooth 26 engages the wheel 21 and the further rotation of the wheel 21 can again start forcing the first catch tooth 26 out of contact with the wheel 21. Consequently, whenever the belt length is such that it allows the arm 13 to rotate far enough towards counter-clockwise direction and this arm rotation lasts long enough to force the hydraulic damper piston 41 to retract sufficiently, the ratchet-wheel 21 can skip another tooth. However, if the arm movement is very fast as is the case during dynamic vibrations of the engine, the arm movement cannot force the ratchet-wheel 21 to skip the tooth. Similarly, when the engine and the hydraulic fluid 43 inside the cylinder 42 is very cold, the increased viscosity of the fluid 43 makes it very difficult to move the piston 41 and the ratchet-pawl 22 connected to it. Consequently, even aggressive arm movement caused by cold engine conditions, cannot force the ratchet-wheel to skip the tooth. In other words, the device according to the present invention will allow the rotation of the ratchet-wheel 21 and the stops 30 and 31 attached to the wheel during normal engine running conditions, but will not allow ratcheting action during erratic running conditions such as aggressive vibration and/or cold starts of a "frozen" engine.

In case there is a need to remove the belt from the engine during a service call of the engine, the tensioner arm 13 can be rotated away from the belt with the following procedure. By pressing the reset push button 61, the button engages the end 29 of the extended tip 23 of the pawl 22. The pawl 22 can be rotated counter-clockwise until the first catch tooth 26 comes out of the contact with the wheel 21. By simultaneously rotating the arm 13 clockwise, the stop post 18 will contact the stop bumper 31 forcing the wheel 21 to rotate together with the arm 13. The rotation of the wheel 21 will push the second catch tooth 27 out of the contact with the wheel, simultaneously moving the first catch tooth 26 again into contact with the wheel. During this operation, the ratchet wheel 21 together with its stop bumpers 30 and 31 has been rotated clockwise by one tooth. By repeating the pressing of the reset push button 61 and turning the arm 13 clockwise as many times as required, it is possible to bring the arm and pulley assembly out of the contact with the belt. If the arm/pulley assembly needs to be locked into the out-of-belt position, the above-mentioned procedure must be repeated until the arm 13 is brought back so much that the installation pin 50 can be reinserted to lock the arm 13.

The mechanical construction of the present invention is by no means limited to that shown in FIGS. 1 to 3. For example, the stop bumpers 30 and 31 could an integrated part of the arm 13 or these bumpers could be replaced by single or multiple flexible connection between the arm and wheel, such as a pair of springs. Similarly, the rigid extension post of them arm could be made flexible and the bumpers could be omitted.

The one-way device can be any known device which only allows movement in one direction, such as commercially available one-way roller clutches, rotational or linear ratchet mechanisms with one or several catch tooth, etc.

In case the damper unit is a hydraulic device, it is preferred that the hydraulic fluid has a low viscosity index allowing it to increase its damping characteristics substantially when cold. However, the damper unit does not have to be a hydraulic device. It could be substituted by any known frictional damper design, or it could be a device whose damping characteristics would be changed by a thermal switch such as a bimetal or wax thermostat actuated toggle. The connection between the damper unit and the one-way device could be any known mechanical construction, which allows either rotational or sliding movement or both between the parts, e.g. pivot pins, journal or ball bearings, thrust plates or cups, etc.

The detail design described above has a bellow type sealing element for the hydraulic cylinder, which can also act as a return spring. However, a separate spring of any known construction, such as compression, extension, torsional or wave washer-type metal or elastomer springs, could be used to keep the ratchet pawl in contact with the ratchet wheel or bar. Furthermore, any spring type component could also be replaced by weights which will add sufficient gravitational forces to bias the tensioner components into right direction.

Although the invention has been described with reference to certain specific embodiments, various modifications thereof will be apparent to those skilled in the art without departing from the scope of the invention.

What is claimed is:

1. A tensioner for an endless belt comprising
   a stationary structure,
   a pivotal structure mounted on said stationary structure for pivotal movement in forward and return directions about a pivotal axis,
   pulley rotatably carried by the pivotal structure for rotational movement about a rotational axis that is parallel to the pivotal axis,
   a spring acting between said stationary and pivotal structures to bias the pivotal structure to pivot in the forward direction, thereby causing movement of the pulley into belt-tensioning relation to a belt with which the pulley is rollingly engaged,
   a one-way device including a backstop disposed on a movable structure movable relative to both said stationary structure and said pivotal structure, said one-way device preventing movement of said movable structure relative to said stationary structure in a first direction corresponding to the return direction of said pivotal structure to thereby enable said backstop to limit movement of said pivotal structure in the return direction, said one-way device being constructed and arranged such that, responsive to said pivotal structure moving in said forward direction, said movable structure moves in a second direction corresponding to said forward direction of said pivotal structure so as to progressively move said backstop in said forward direction relative to said stationery structure in accordance with the movement of said pivotal structure, and
   a damper operatively connected to said one-way device, said damper being constructed and arranged to restrict movement of said movable structure in said second direction caused by sudden, short-time vibratory movements or dynamic vibrations in cold conditions.

2. A tensioner as defined in claim 1, wherein said movable structure is a ratchet ring carrying said moveable backstop and mounted for pivotal movement with respect to said stationary structure about said pivotal axis, and wherein said one-way device further comprises a pawl pivoted on said stationary structure and constructed and arranged to engage selective ratchet teeth to prevent pivotal movement of said ratchet ring in a direction corresponding to the return direction of said pivotal structure.

3. A tensioner as defined in claim 2, wherein said pawl comprises an arcuate member pivoted to said stationary structure intermediate opposite ends of said arcuate member, said arcuate member having a catch on each of opposite ends thereof, both of said catches being configured to engage teeth on said ratchet ring and one catch or the other engaging a tooth on said ratchet ring as said arcuate member pivots, said arcuate member further having an extended tip on one end thereof that is pivotally connected to the damper such that said damper damps pivotal movement of said arcuate member, thereby restricting advancement of said one-way mechanism.

4. A tensioner as defined in claim 3 wherein said damper comprises a hydraulic piston and cylinder unit having hydraulic fluid therein to provide viscous damping.

5. A tensioner as defined in claim 4 wherein a reset device is provided having structure which is constructed and arranged to effect a manual movement of said ratchet ring in a direction corresponding to the return direction of said pivotal structure.

6. A tensioner as defined in claim 5 wherein said reset device structure includes a guide fixed to said stationary structure and a pin movably carried by said guide in a position to engage said extended tip.

7. A tensioner as defined in claim 1 wherein said damper comprises a hydraulic piston and cylinder unit having hydraulic fluid therein to provide viscous damping.

8. A tensioner as defined in claim 1 wherein a reset device is provided having structure which is constructed and arranged to effect a manual movement of said one-way device in a direction corresponding to the return direction of said pivotal structure.

9. A tensioner as defined in claim 8 wherein a reset device is structure includes a guide fixed to said stationary structure and a pin movably carried by said guide in a position to engage and release said one-way device.

10. A tensioner for an endless belt comprising
    a stationary structure,
    a pivotal structure mounted on said stationary structure for pivotal movement in forward and return directions about a pivotal axis,
    a pulley rotatably carried by the pivotal structure for rotational movement about a rotational axis that is parallel to the pivotal axis,
    a spring acting between said stationary and pivotal structures to bias the pivotal structure to pivot in the forward direction, thereby causing movement of the pulley into belt-tensioning relation to a belt with which the pulley is rollingly engaged,
    a one-way device including a movable backstop disposed thereon, said backstop limiting movement of said pivotal structure in the return direction, said one-way device being pivotally operable in response to a forward extent of pivotal movement of said pivotal structure in said forward direction to establish progressively different positions of said backstop, and
    a reset device having structure which is constructed and arranged to effect a manual movement of said one-way device in a direction corresponding to the return direction of said pivotal structure.

11. A tensioner as defined in claim 10, wherein said reset device structure includes a guide fixed to said stationary structure and a pin movably carried by said guide in a position to engage and release said one-way device.

* * * * *